(12) United States Patent
Hahn et al.

(10) Patent No.: US 8,902,360 B2
(45) Date of Patent: Dec. 2, 2014

(54) METHOD FOR DETECTING IMAGE SEQUENCES HAVING LINEWISE REPEATED DATA

(75) Inventors: Marko Hahn, Neubiberg (DE); Christian Tuschen, Munich (DE); Günter Scheffler, Munich (DE); Markus Schu, Erding (DE)

(73) Assignee: Entropic Communications, Inc., San Diego, CA (US)

( * ) Notice: Subject to any disclaimer, the term of this patent is extended or adjusted under 35 U.S.C. 154(b) by 1600 days.

(21) Appl. No.: 12/098,849

(22) Filed: Apr. 7, 2008

(65) Prior Publication Data

US 2008/0246874 A1    Oct. 9, 2008

(30) Foreign Application Priority Data

Apr. 5, 2007  (DE) .......................... 10 2007 016 596

(51) Int. Cl.
*H04N 7/00* (2011.01)
*H04N 7/01* (2006.01)
*H04N 5/14* (2006.01)

(52) U.S. Cl.
CPC . *H04N 7/012* (2013.01); *H04N 5/14* (2013.01)
USPC ........................................................ 348/497

(58) Field of Classification Search
USPC ........................................................ 348/497
See application file for complete search history.

(56) References Cited

U.S. PATENT DOCUMENTS

| 5,689,301 A | 11/1997 | Christopher et al. ........... 348/97 |
| 6,512,537 B1* | 1/2003 | Shimizu et al. ............... 348/155 |
| 7,961,253 B2* | 6/2011 | Jen ................................. 348/448 |
| 2004/0189877 A1* | 9/2004 | Choi et al. ..................... 348/700 |
| 2006/0187302 A1 | 8/2006 | Fuji |

FOREIGN PATENT DOCUMENTS

| EP | 0318760 | 11/1988 | .......................... 5/44 |
| WO | WO 94/30006 | 12/1994 | .......................... 5/14 |

\* cited by examiner

*Primary Examiner* — Olugbenga Idowu
(74) *Attorney, Agent, or Firm* — Richard Bachand; Duane Morris LLP

(57) ABSTRACT

A method for detecting a video signal that represents an image sequence and exhibits linewise repeated video data comprises selecting a plurality of line groups each having a first, a second and a third line, which originate from two consecutive fields in the case of a field sequence and from one field in the case of a frame sequence. The method determines for each line group a first line-distance measure for a difference between video contents of the first and second lines and a second line-distance measure for a difference between video contents of the second and third lines. The method then interprets the first and second line-distance measures with regard to the presence of a significant difference between these line-distance measures.

9 Claims, 4 Drawing Sheets

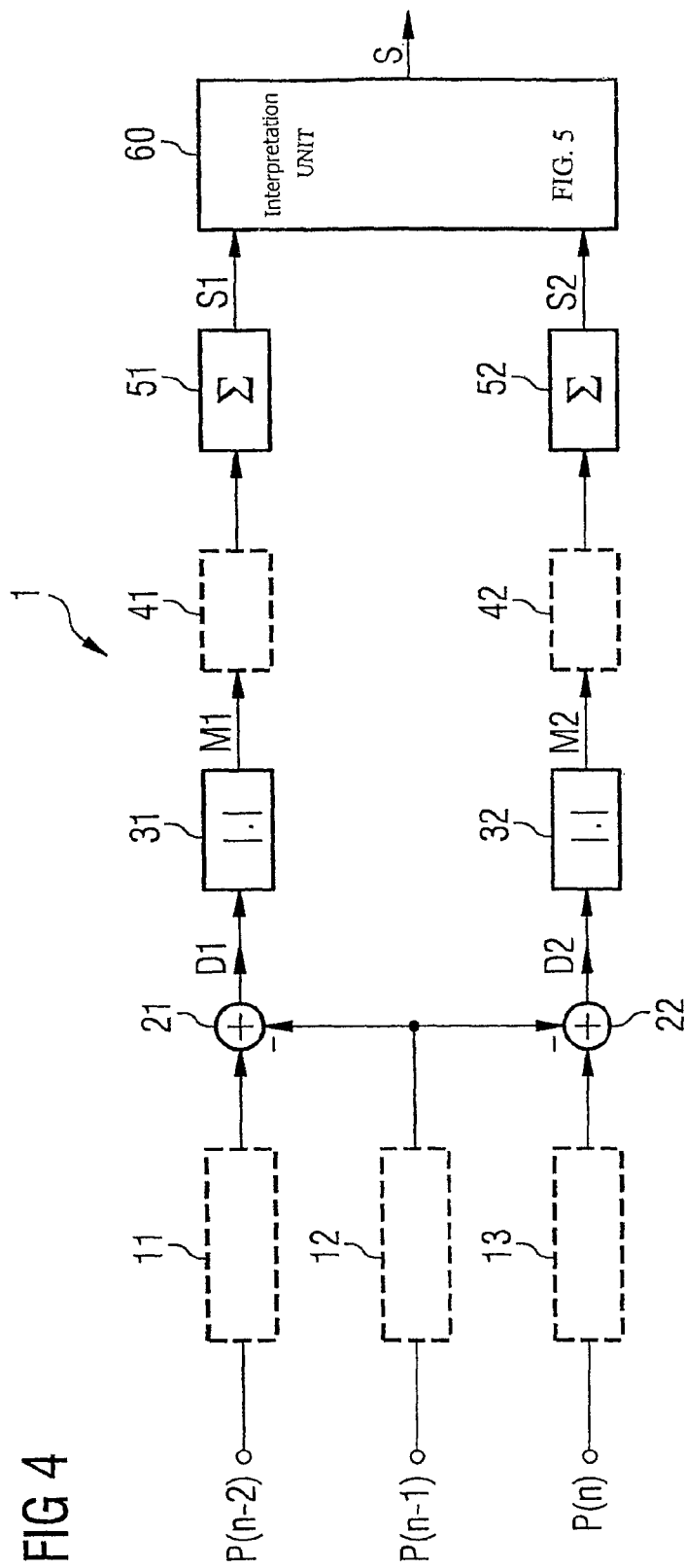

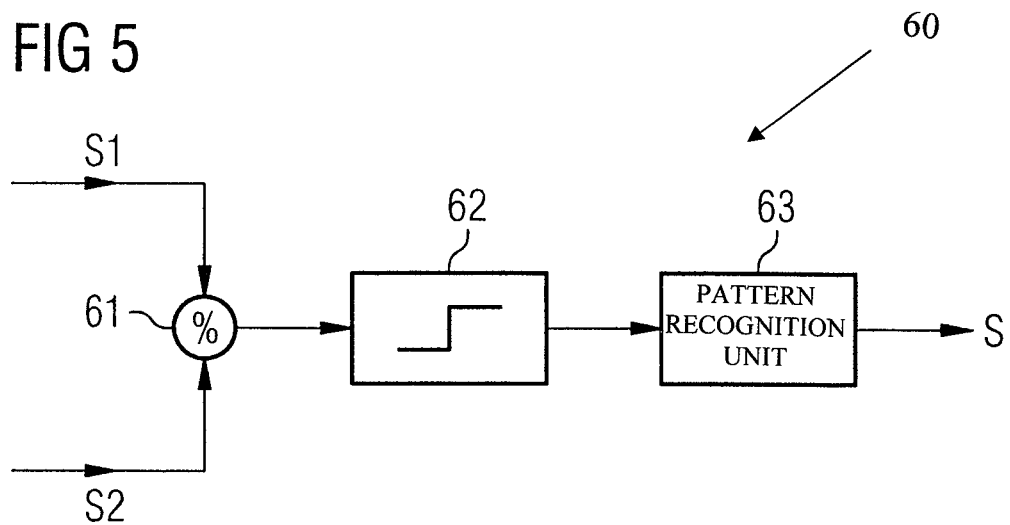
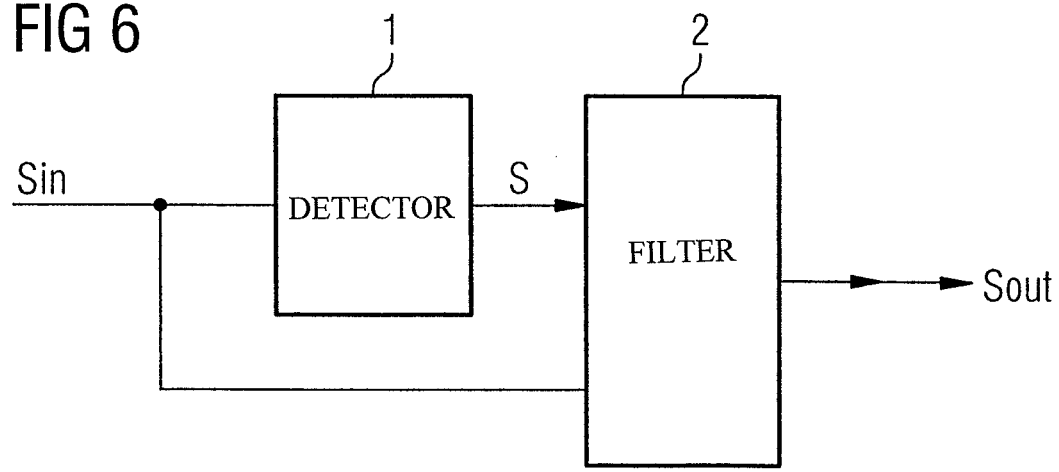

METHOD FOR DETECTING IMAGE SEQUENCES HAVING LINEWISE REPEATED DATA

PRIORITY INFORMATION

This patent application claims priority from German patent application 10 2007 016 596.1 filed Apr. 5, 2007, which is hereby incorporated by reference.

BACKGROUND OF THE INVENTION

The invention relates to processing video signals representing a sequence of images in which two adjacent image lines each exhibit identical video contents.

Such image sequences are obtained for example by discarding every second field in a 50 Hz field sequence, such as is usual in television technology, and reproducing in place thereof the content of the preceding field in merely line-offset (interlaced) fashion. As a result, adjacent lines of two consecutive fields have identical video contents. The consequence is that scenes photographed with a 50 Hz image sequence are effectively reproduced with only a 25 Hz image sequence and the vertical resolution is reduced. This becomes unpleasantly apparent to a viewer, in particular on large-format displays, as stairstep effects or flicker along edges running obliquely in the image.

Such artifacts can be at least diminished by suitable image-processing techniques applied in receiver-side fashion, provided, however, that such video signals or image sequences having linewise repeated data are recognized as such, especially since these are not specially identified by the program provider.

There is a need for a technique of detecting image sequences having linewise repeated video data.

SUMMARY OF THE INVENTION

Detecting a video signal that represents a field sequence having linewise structured fields and exhibits linewise repeated video data, for each of a plurality of successive fields comprises the steps:

selecting a plurality of line groups each having a first line and a third line disposed immediately consecutively in a specified image direction in the field, and each having a second line disposed at a position between the first line and the third line in a temporally immediately adjacent field;

determining for each line group a first measure for a difference between video contents of the first line and the second line and a second measure for a difference between video contents of the second line and the third line;

adding the first measures to obtain a first sum and adding the second measures to obtain a second sum; and comparing the first measure and the second measure and generating a first detection signal in dependence on the comparison.

Here pattern recognition is applied to a signal sequence exhibiting a plurality of first detection signals, use being made of the fact that the first detection signals change substantially from field to field in the case of field sequences having line-wise repeated video data.

A second embodiment includes detecting a video signal that represents an image sequence having line-wise structured frames and exhibits line-wise repeated video data. This method differs from the above-explained method applicable to field sequences only in that the three lines of a line group originate from one image and not from two temporally immediately adjacent fields.

In the context of the invention, "video content of a line or a line section" means the totality of video information values associated with the pixels of the line or line section. Video information values here can be lightness values (luminance values) or color contrast value (chrominance values).

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 4 illustrates an embodiment according to an aspect of the invention with reference to an apparatus suitable for performing the method;

FIG. 5 depicts an embodiment of an interpretation circuit of the apparatus illustrated in FIG. 4; and FIG. 6 illustrates an image-processing apparatus in which a video signal is supplied to a detector.

DETAILED DESCRIPTION OF THE INVENTION

Figure 1:
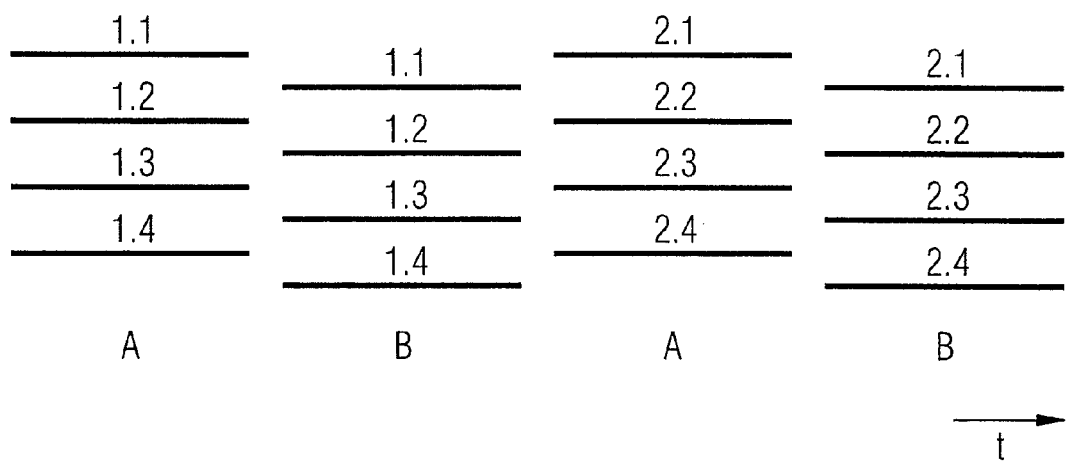
FIG. 1 depicts schematically a field sequence having linewise repeated video data.

FIG. 1 schematically illustrates a field sequence having line-interlaced fields, that is, a field sequence in which two temporally immediately consecutive fields occupy different grid positions. The different grid positions are identified by A and B in FIG. 1, grid position A denoting for example fields having odd-numbered lines and grid position B denoting fields having even-numbered lines. The individual image lines, which are represented schematically in FIG. 1 merely in the form of dashes, each contain a number of pixels with which video information values, for example luminance values or chrominance values, are associated. The image lines in which video information values are associated with pixels in one field contain no video information values in the field temporally immediately adjacent in each case. Video contents of the individual lines result from the totality of video information values associated with the individual pixels of the line in question.

In the field sequence illustrated in FIG. 1, video contents of the individual lines are contained in such repeated fashion that every two consecutive fields contain image lines each having the same video contents. If one considers for example the fields in grid position A, then the video contents of the image lines of these fields match the video contents of the image lines of the fields temporally succeeding each and belonging to grid position B. In other words, the video content of an image line of a field in grid position A matches the video content in the next image line of the succeeding field in grid position B. Such a field sequence is hereinafter referred to as a field sequence having line-wise repeated video data.

Such field sequences having line-wise repeated video data can be generated for example by using a video camera to photograph fields at a field frequency of 50 Hz, discarding every second field and reproducing the remaining fields twice consecutively with offset grid positions. The effective field frequency resulting from the discarding of every second image is only 25 Hz, so that a viewer of such a field sequence perceives jerk effects.

Figure 2:
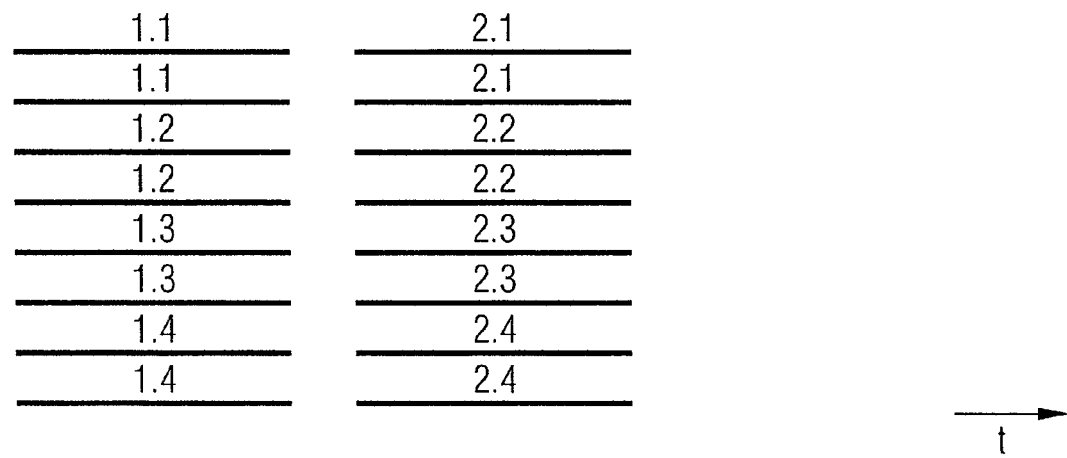
FIG. 2 depicts schematically a frame sequence having linewise repeated video data.

FIG. 2 schematically illustrates a frame sequence having line-wise repeated video data. Within a line-wise structured image, every two adjacent image lines exhibit identical video contents. It should be noted in this connection that in FIGS. 1 and 2, for purposes of explanation, the video contents of the individual lines are identified by numerical sequences, identical numerical sequences representing identical video contents.

A frame sequence according to FIG. 2 having line-wise repeated video data can be produced by known deinterlacing techniques, for example from the field sequence having linewise repeated video data as illustrated in FIG. 1.

The above-explained artifacts, which arise through a reduction in the temporal resolution, that is, through deletion of every second field of the field sequence, or through reduction of the spatial resolution, that is, through repeated reproduction of the video content of one image line in two consecutive lines, can be reduced with interpolation methods. This presupposes, however, that video signals representing such field sequences or frame sequences having line-wise repeated video data are recognized as such. A method for recognizing or detecting such video signals shall now be presented.

In one embodiment, the method first provides for selecting a plurality of line groups, each having a first line, a second line and a third line, and comparing video contents of these lines with one another in a manner yet to be explained. The selection of these line groups is done in different ways for field sequences and frame sequences, as will be explained in what follows with reference to FIGS. 3A and 3B.

In a field sequence, with reference to FIG. 3A, a line group comprises two immediately adjacent lines P(n−2), P(n) in one field in one grid position, hereinafter referred to as the first and third image lines, and a second image line P(n−1) disposed at a line position between the first and third image lines in a temporally immediately adjacent field. In a frame sequence, with reference to FIG. 3B, a line group comprises three lines P(n−2), P(n−1), P(n) immediately adjacent in a frame, hereinafter referred to as the first, second and third lines. Unless stated otherwise, the discussion that follows holds for the processing of line groups regardless of whether these line groups originate from a field sequence or a frame sequence.

Figure 3A:
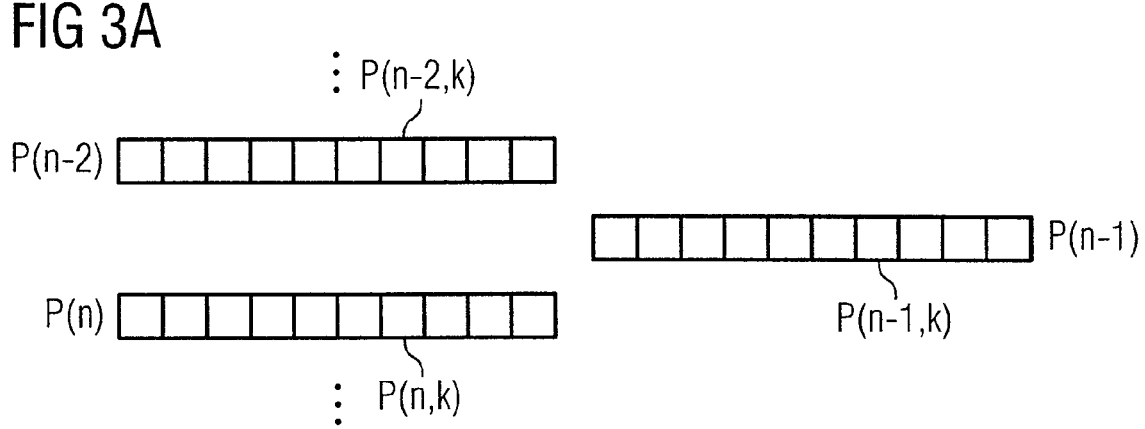
FIG. 3 illustrates the selection of image lines of a field sequence (FIG. 3A) and of a frame sequence (FIG. 3B) for the performance of a method according to an aspect of the invention.
Figure 3B:
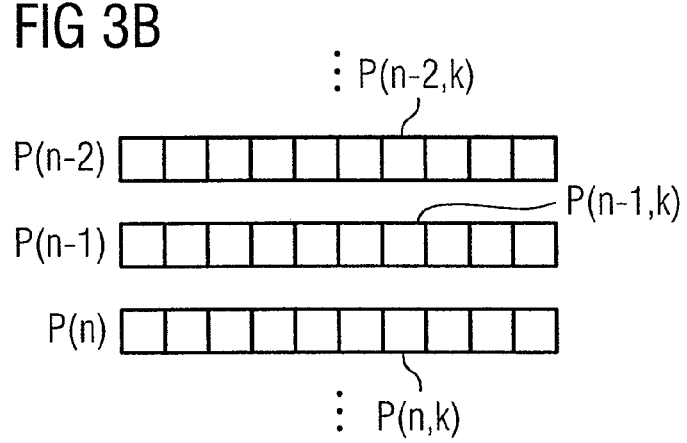

Each of the individual image lines comprises a number of pixels, as schematically illustrated in FIGS. 3A and 3B. Associated with each of the individual pixels is at least one video information value, for example a luminance value and two chrominance values. The detection method explained in what follows employs for example only one of these video information values, for example the luminance value, for detecting the presence of a video signal having linewise repeated video data. The video information values associated with the individual pixels are hereinafter denoted by P(x, y), x being the position of the line within the image and y the position of the pixel within the line.

In what follows, the further method is explained with reference to an apparatus suitable for performing this method, as is illustrated schematically in FIG. 4. In this method, for each line group, a first measure for a difference between video contents of the first and second lines and a second measure for a difference between video contents of the second and third lines are formed. To this end, the difference between video information values of the first and second lines P(n−2), P(n−1) is formed pixel by pixel, and differences between video information values of the third line P(n) and the second line P(n−1) are formed pixel by pixel. In the apparatus illustrated in FIG. 4, a first subtraction unit 21 subtracts video information values of the second line P(n−1) from video information values of the first line P(n−2) pixel by pixel. A second subtraction unit 22 subtracts video information values of the second line P(n−1) from video information values of the third line P(n) pixel by pixel. Optionally, the video information values of the individual lines are each subjected to low-pass filtering before subtraction. Present for this purpose are low-pass filters 11, 12, 13, which are supplied with the consecutive video information values of the individual lines and at whose outputs low-pass-filtered video information values are available, which are further processed by the subtraction units 21, 22. In FIG. 4, D1 denotes a first pixel difference available at the output of the first subtraction unit 21, and D2 denotes a second pixel difference available at the output of the second subtraction unit 22. Here $$D1=P(n-2,k)-P(n-1,k), \quad (1a)$$

$$D2=P(n,k)-P(n-1,k), \quad (1b)$$

wherein k stands for the position of the individual pixels within the first, second and third lines.

The differences D1, D2 are supplied to first and second absolute-value-forming units 31, 32, respectively, which furnish at their outputs values M1, M2, respectively, proportional to the absolute value of the difference in question. Thus $$M1 \sim |D1|, \quad (2a)$$

$$M2 \sim |D2|. \quad (2b)$$

The values of M1 and M2 represent a measure for the difference between the two video information values employed in forming the respective differences D1, D2. Instead of forming the absolute value, an even-numbered power of the differences D1, D2 can also be formed in order to determine a measure for the difference of two video information values.

The difference measures M1 determined for the pixels of the first and second image lines P(n−2), P(n−1) are summed, by a first accumulator 51, while the difference measures determined for the pixels of the second and third image lines P(n−1), P(n) are summed by a second accumulator 52. In what follows, let S1 stand for the sum of a number of first difference measures M1 and let S2 stand for the sum of a number of second difference measures M2. If these two sum values S1, S2 are considered for only one line group at a time, the first sum value S1 represents a measure for a difference between video contents of the first and second lines P(n−2), P(n−1), while the second sum value S2 represents a measure for a difference between video contents of the second and third lines P(n−1), P(n).

Now the video contents are more similar the smaller the sum values S1, S2 are. In the case of video contents identical between adjacent lines, that is, when identical video information values are associated with the individual pixels of the first and second lines or with the individual pixels of the second and third lines, these sum values S1, S2, which are also referred to hereinafter as line-distance measures, are equal to zero or, when noise effects are taken into account, very small. In what follows, let S1(n) represent the line-distance measure for the first and second lines P(n−2), P(n−1) of the line group, and let S2(n) represent the line-distance measure for the second and third lines P(n−1), P(n) of the line group. In the example illustrated here, in which the absolute value of the difference is formed as the measure for a difference of two pixels, $$S1(n) = \sum_k |P(n-2, k) - P(n-1, k)|, \quad (3a)$$

$$S2(n) = \sum_k |P(n-1, k) - P(n, k)|. \quad (3b)$$

In order to determine the line-distance measure, all pixels of two adjacent lines can be compared with one another. What is more, it is also possible to select pixel groups within the lines. These pixel groups can be chosen arbitrarily and can for example comprise only every i-th pixel of the lines, with i>1.

In the case of image sequences having line-wise repeated video data, the video information values of two adjacent lines of the line groups explained with reference to FIGS. 3A and 3B are identical and thus have a maximum correlation, while the correlation between the other two adjacent lines of the line group is usually smaller. In the case of images not having linewise repeated data, it can be assumed that the correlations between the video information values of adjacent lines within a line group are approximately equal. As a consequence of image sequences having line-wise repeated data, there is a significant difference between the first line-distance measure $S1(n)$ and the second line-distance measure $S2(n)$ for a line group. These line-distance measures can thus be employed for detecting an image sequence having line-wise repeated data. In one embodiment, provision is thus made for determining the difference of the two line-distance measures $S1(n)$, $S2(n)$ is determined and the presence of an image sequence having line-wise repeated data is inferred if this difference is greater than a specified threshold value. Alternatively, the quotient of these line-distance measures can be determined and the presence of an image sequence having line-wise repeated video data inferred if this quotient is greater than 1 by a specified value or less than 1 by a specified value. In the case of image sequences not having line-wise repeated video data, in contrast, this quotient is approximately 1.

The interpretation of only one line group does not yield a conclusive result if the line group contains a horizontal boundary between two homogeneous regions within the image. Without an image sequence having line-wise repeated video data necessarily being present, it is possible for two adjacent image lines of the line group to contain identical video information while the items of video information of the other two adjacent lines of the line group differ substantially. To avoid a false detection, an aspect of the present invention selects a plurality of line groups within two consecutive fields (compare FIG. 3A) or within a frame (compare FIG. 3B), sums the first line-distance measures determined for these line groups and sums the second line-distance measures determined for these line groups. This addition can be performed for example by accumulators 51, 52, such that represent the sum of a plurality of first line-distance measures or of second line-distance measures, respectively. To determine the presence of an image sequence having linewise repeated video data, these sums of line-distance measures are processed in correspondence with the above-explained line-distance measures.

The line groups whose line-distance measures are added are here to be selected for a frame sequence in such fashion that the first lines of the line groups are either exclusively even-numbered or exclusively odd-numbered lines. Of course the second and third lines of the individual line groups are to be chosen in such fashion that in each case they always adjoin the respective first line of the individual line groups in the same image direction, that is, either upwardly or downwardly.

In the case of a field sequence having linewise repeated video data, the presence of a significant difference between the first line-distance measure S1, or the sum of a plurality of first line-distance measures, and the second line-distance measure, or the sum of a plurality of second line-distance measures, depends on whether the first and third image lines P(n−2), P(n) of a line group originate from a field in first grid position A or a field in second grid position B. If the above-explained technique is applied to the field sequence illustrated in FIG. 1, wherein the items of video information of the fields in first grid position A are each repeated in the succeeding fields in grid position B, then in the case of image sequences having linewise repeated video data there is a significant difference between the first and second line-distance measures if the first and third image lines are selected from fields in first grid position A and the second image lines of the individual line groups originate from fields in second grid position B.

The sum of a plurality of line-distance measures determined for a plurality of line groups within a frame or within two immediately consecutive fields will be referred to as an image measure in what follows. A first image measure here is equal to the sum of a plurality of first line-distance measures, while a second image measure is equal to the sum of a plurality of second image-distance measures. That is, $$S1=\Sigma S1(n), \quad (4a)$$

$$S2=\Sigma S2(n). \quad (4b)$$

Here S1, S2 denote first and second image measures; as already explained, $S1(n)$, $S2(n)$ denote first and second line-distance measures determined for a line group within an image or within two consecutive fields.

In the case of frame sequences, if the line groups are chosen such that the first and third image lines of the line groups are either exclusively even-numbered or exclusively odd-numbered lines, then for consecutive frames having linewise repeated data it is always the case that there is a significant difference between the first image measure S1 and the second image measure S2. In order to avoid erroneously inferring the presence of an image sequence having linewise repeated video data, for example on the basis of the video content of a frame, one embodiment of the invention compares the first and second image measures S1, S2 for a plurality of consecutive images of the frame sequence and infers the presence of an image sequence having linewise repeated video data only if there is a significant difference between the first and second image measures S1, S2 for a plurality of consecutive frames. A significant difference exists for example if the absolute value of the difference between the first and second image measures is greater than a specified threshold value or if the quotient is greater than 1 by a first threshold value or less than 1 by a second threshold value.

In order to detect a field sequence having linewise repeated video data, one embodiment determines first and second image-distance measures for each field of a number of consecutive fields. In the case of field sequences having linewise repeated video data, the first and second image-distance measures S1, S2 for every second field exhibit a significant difference, specifically when the first and third lines of the line group originate from a field in first grid position A, while there is no significant difference between the image-distance measures for the remaining fields, specifically when the first and third lines of the line group originate from fields in second grid position B. Such a periodic alternation between the existence and nonexistence of a significant difference in the case of field sequences implies the presence of a field sequence having linewise repeated video data.

Referring to FIG. 4, the above-explained interpretation of the line- or image-distance measures S1, S2 available at the output of accumulators 51, 52, respectively, is performed by an interpretation unit 60 to which the first and second line- or image-distance measures S1, S2 are supplied. An embodiment of this interpretation circuit is illustrated in FIG. 5.

The illustrated interpretation circuit exhibits a divider 61, which is supplied with the first and second image-distance measures S1, S2 and forms the quotient of these two image-distance measures. If there is a significant difference between these two image-distance measures, this quotient is either significantly greater than 1 or significantly less than 1. Whether this quotient is greater or smaller than 1 for a frame sequence having linewise repeated video data depends on whether the first image lines of the individual line groups are even-numbered or odd-numbered lines.

The divider 61 provides an output signal to a threshold decision unit 62, which determines whether the quotient of the first and second image-distance measures S1, S2 lies above or below a specified threshold value. Output signals of this threshold decision unit 62 are provided to a pattern-recognition unit 63. The pattern-recognition unit interprets the values output from the threshold decision unit for a sequence of consecutive fields or frames. If the quotients of the first and second image-distance measures S1, S2 for a number of consecutive frames in a frame sequence lie above a specified threshold value or below a specified threshold value, that is, outside a window specified by these threshold values, the presence of an image sequence having linewise repeated video data is inferred, as is indicated by a detector signal S present at the output of pattern-recognition unit 63.

If the output signal of the threshold detector 62 for a field sequence having linewise repeated video data alternates periodically between a value indicating a significant difference between the first and second image-distance measures and a value indicating no significant difference, the presence of a field sequence having linewise repeated video data is inferred, as is indicated by the detector signal S.

The threshold detector 62 may be a window comparator, which infers a specified signal level, for example a high level, when the input signal lies above a first threshold value or below a second threshold value. The upper threshold here is chosen significantly greater than 1 and the lower threshold value is chosen significantly less than 1.

Instead of a difference between the first and second image-distance measures, the quotient of these image-distance measures is formed in the interpretation circuit illustrated in FIG. 5. The absolute values of the pixels employed for detection or their video information values have only a negligible effect on the threshold decision in this case.

Optionally, it is possible in the above-explained method to map the pixel-distance measures M1, M2 onto modified pixel-distance measures in accordance with a coring characteristic before summing, as is done by coring units 41, 42 connected ahead of the accumulators in the apparatus illustrated in FIG. 4. Here the pixel-distance measures are reduced by a specified constant value and pixel-distance measures smaller than or equal to this value are set equal to zero. The noise sensitivity can be diminished in this way.

The information gained from the above-explained method as to whether a video signal having linewise repeated video data is present can be used for adaptive filtering of the video signal with the aim of reducing the artifacts brought about by linewise repetition of video data. FIG. 6 illustrates an image-processing apparatus in which a video signal is supplied to a detector 1, explained with reference to FIG. 4, at whose output a detector signal S is available that contains an item of information as to the presence of a video signal having linewise repeated video data. This detector signal S, together with the video signal, is supplied to a filter configuration 2 connected thereafter, which filters the video signal in dependence on the detector signal. This filter is for example a vertical low-pass filter that subjects the video information values of pixels adjacent in the vertical direction of an image to low-pass filtering. Naturally, this filter can be any other filter for reducing the artifacts brought about by linewise repetition of video data. This filter can in particular be so fashioned as to perform motion-compensated filtering or interpolation. The video signal supplied to the apparatus in FIG. 6 is denoted by Sin while the video signal available at the output of the filter configuration 2 is denoted by Sout. In a manner not illustrated in greater detail, the selection of individual line groups for determining the detection signal by the detector 1 is done either within the detector (not illustrated in FIG. 5) or in a selection unit (not illustrated) connected ahead of the detector.

Although the present invention has been illustrated and described with respect to several preferred embodiments thereof, various changes, omissions and additions to the form and detail thereof, may be made therein, without departing from the spirit and scope of the invention.

What is claimed is:

1. A method for detecting a video signal that represents a field sequence having linewise structured fields and exhibits linewise repeated video data, the method comprising the following steps for each of a plurality of consecutive fields in a first grid position:
    selecting a plurality of line groups each having a first and a third line disposed immediately consecutively in a specified image direction in a first field and each having a second line disposed at a position between the first and third lines in a temporally immediately adjacent field;
    determining for each line group a first line-distance measure for a difference between video contents of the first and second lines and a second line-distance measure for a difference between video contents of the second and third lines; and
    interpreting the first and second line-distance measures with regard to the presence of a significant difference between these line-distance measures, to provide an output signal indicative of the presence of a field sequence having linewise repeated video data.

2. The method of claim 1, wherein first and second line-distance measures are determined for a plurality of line groups in two consecutive fields, wherein a first sum of first line-distance measures is formed and a second sum of second line-distance measures is formed and wherein the first sum and the second sum are interpreted with regard to the presence of a significant difference between these sums.

3. The method of claim 2, wherein first and second sums of line-distance measures are determined for a plurality of consecutive groups each having two fields, wherein the presence of a significant difference is determined for each field group and wherein the presence of an image sequence having linewise repeated video data is inferred if there are alternately a significant difference and no significant difference.

4. The method of claim 1, wherein a quotient of the first and second line-distance measures or of the sum of the first line-distance measures and the sum of the second line-distance measures is formed for each image and wherein a significant difference is present if this quotient lies above a first specified threshold value or below a second specified threshold value.

5. The method of claim 1, wherein the determination of the first and second line-distance measures comprises:

selecting a plurality of groups of pixels each exhibiting a first pixel in the first line, a second pixel in the second line and a third pixel in the third line, each at identical positions within the lines;

calculating for each of the groups a measure for a difference between a video information value associated with the first pixel and a video information value associated with the second pixel and a second measure for a difference between the video information value associated with the second pixel and a video information value associated with the third pixel;

summing the measures for the differences between the first and second pixels of the groups, a sum obtained in this way representing the first measure; and summing the measures for the differences between the second and third pixels of the groups, a sum obtained in this way representing the second measure.

6. The method of claim 5, wherein calculating the measures for the differences of the video information values comprises forming an absolute value of these differences.

7. The method of claim 5, wherein calculating the measures for the differences of the video information values comprises forming even-numbered powers of these differences.

8. The method of claim 5, wherein low-pass filtering is applied to the video information values of the pixels of at least one of the first, second and third lines before the determination of the first and second measures.

9. The method of claim 4, wherein the pixel differences are mapped onto modified pixel differences in accordance with a coring characteristic before addition.

* * * * *